J. BUTLER.
MOLDING MACHINE.
APPLICATION FILED APR. 7, 1905.

910,640.

Patented Jan. 26, 1909.

4 SHEETS—SHEET 1.

Witnesses:
F. G. Wachenburg.
Henry Thieme.

Inventor:
John Butler
By a Attorneys
Brown Seward

THE NORRIS PETERS CO., WASHINGTON, D. C.

J. BUTLER.
MOLDING MACHINE.
APPLICATION FILED APR. 7, 1905.
910,640.
Patented Jan. 26, 1909.
4 SHEETS—SHEET 2.
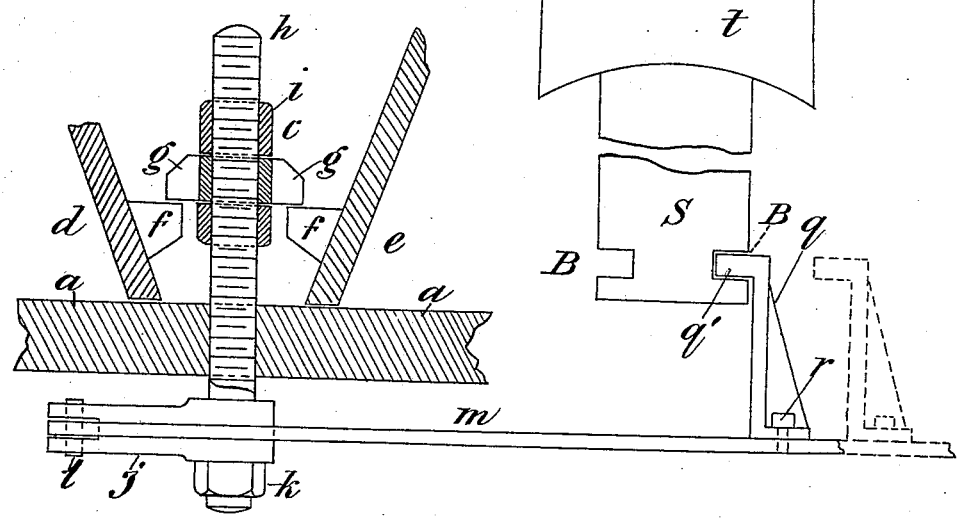
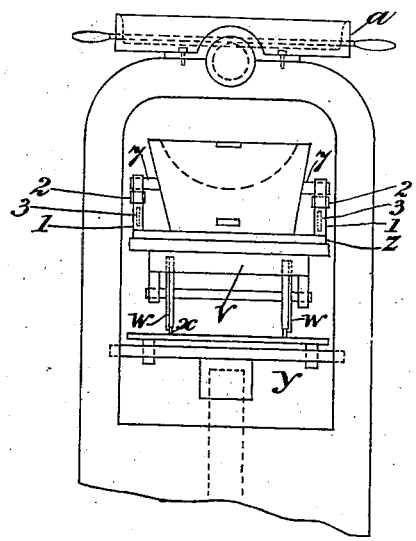
Witnesses:
Inventor:
John Butler
By attorneys
Brown & Seward J. BUTLER.
MOLDING MACHINE.
APPLICATION FILED APR. 7, 1905.
910,640.
Patented Jan. 26, 1909.
4 SHEETS—SHEET 3.
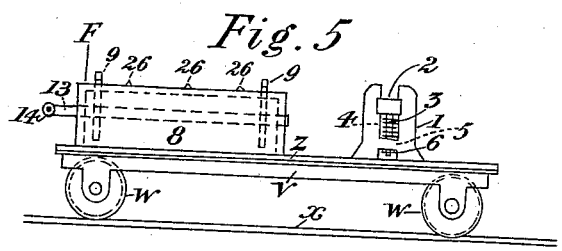
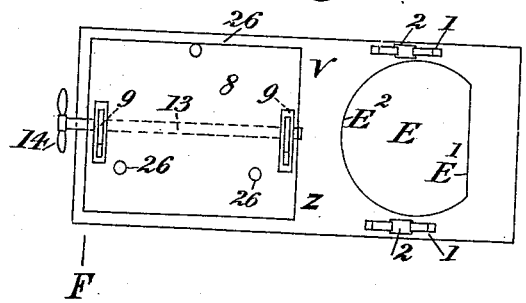
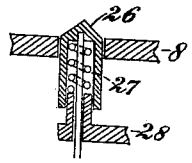
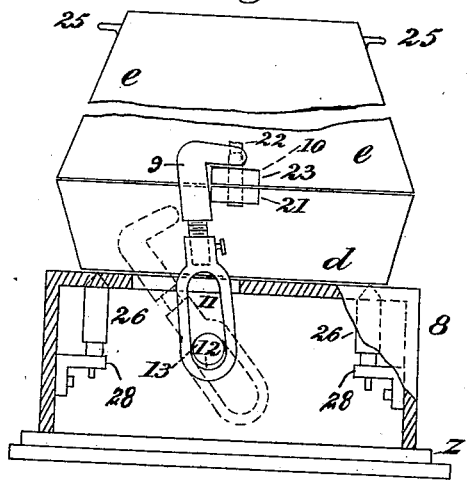
Witnesses:
F. G. Wachenberg
Henry Thieme
Inventor:
John Butler
by attorneys
Brown & Seward J. BUTLER.
MOLDING MACHINE.
APPLICATION FILED APR. 7, 1905.
910,640.
Patented Jan. 26, 1909.
4 SHEETS—SHEET 4.
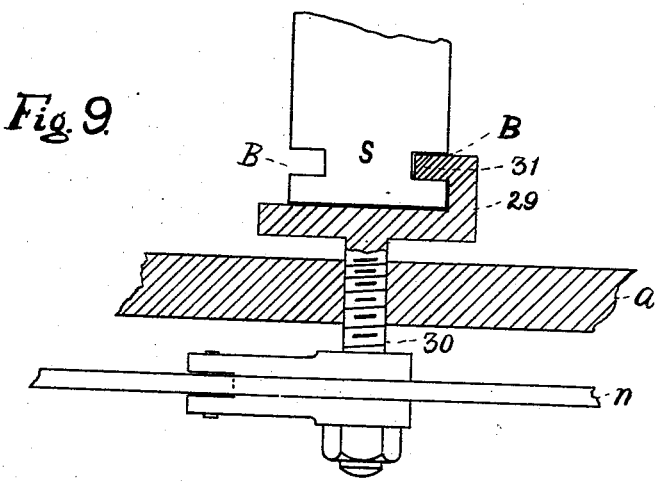
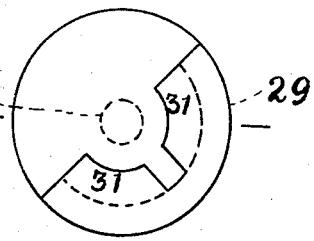
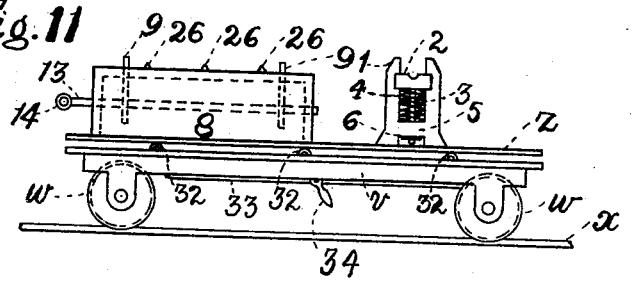
Witnesses:
Henry Thieme
F. George Barry
Inventor:
John Butler
by attorneys

UNITED STATES PATENT OFFICE.

JOHN BUTLER, OF SALFORD, ENGLAND.

MOLDING-MACHINE.

No. 910,640.  Specification of Letters Patent.  Patented Jan. 26, 1909.

Application filed April 7, 1905. Serial No. 254,340.

*To all whom it may concern:*

Be it known that I, JOHN BUTLER, commercial traveler, a subject of the King of the United Kingdom of Great Britain and Ireland, and resident of 219 High street, Pendleton, Salford, in the county of Lancaster, England, have invented a new and useful Improvement in Molding-Machines, of which the following is a specification.

This invention consists in improvements in connection with the turn-over-tables of molding machines and in apparatus for gripping and releasing molding boxes and runners employed in connection with such machines and in apparatus for facilitating the manipulation of molding boxes and the placing of molding boxes together for casting.

Figure 1:
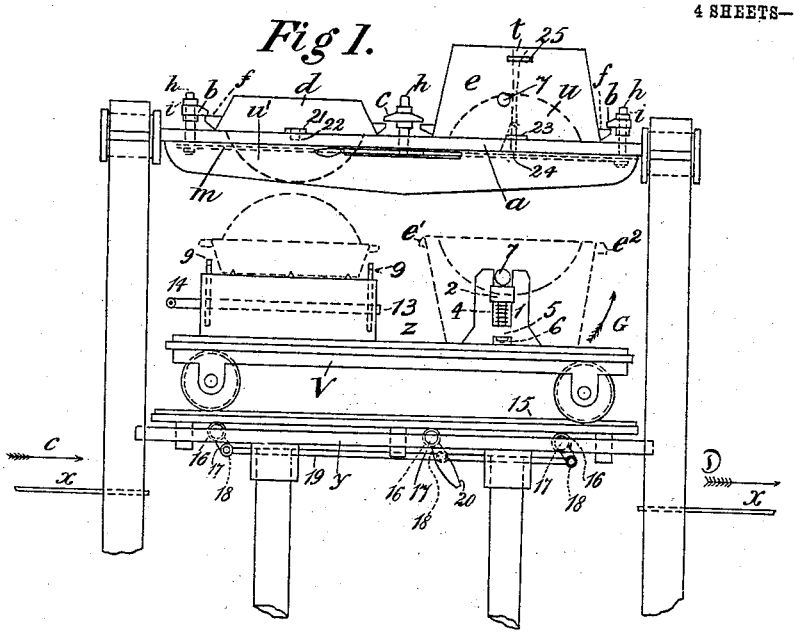
Figure 2:
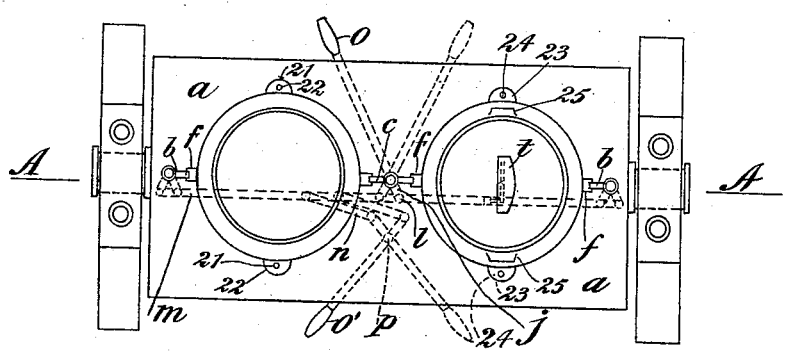

In the accompanying drawings in all the figures of which the same letters of reference are employed to indicate corresponding parts, Figure 1 is a front elevation and Fig. 2 is a plan showing so much of a molding machine with a turn-over-table as is requisite for the illustration of this invention and the manner in which it may be carried into effect and Fig. 3 is, partly, a rear elevation and, partly, a longitudinal section of part of the mechanism shown in Figs. 1 and 2 being drawn upon a larger scale than Figs. 1 and 2 and taken in so far as it is a section on the plane indicated by the line A A of Fig. 2. Fig. 4 is an end elevation of a portion of the machine illustrated in Figs. 1 and 2 and Fig. 5 is a side elevation and Fig. 6 is a plan of a carriage used in the said machine. Fig. 7 is a vertical section upon a larger scale than Figs. 5 and 6 of a spring-buffer used in the carriage shown in Figs. 5 and 6. Fig. 8 is in part a side elevation and in part a vertical section taken on the plane indicated by the line F F of Figs. 5 and 6 and drawn upon a larger scale than Figs. 5 and 6. Fig. 9 is a vertical section and Fig. 10 a plan illustrating a modified form of catch for holding runners. Fig. 11 is a side elevation illustrating a modified form of supporting blocks which may be used in the carriage aforesaid and a modified form of mechanism which may be used in raising molding boxes placed upon such carriage.

Hitherto in the formation of molds for rice-bowls and other hollow and flat ware by means of turn-over-tables much inaccuracy of form of the molds and consequent imperfection in the castings produced therein have been caused by molding boxes and runners failing to be held accurately and securely in position during the ramming or consolidation of the sand or other molding material and by the premature release of runners and molding boxes in the turning over of the turn-over-tables. Further, owing to the manner in which the turn-over-tables of molding machines now in use are formed and arranged, only a limited number of molding boxes for the formation of molds for rice-bowls and the like can be mounted on the table of a machine of this kind and after the boxes have been placed in position each box has to be separately fastened to the table on which it is mounted in order that the ramming or compression of the sand or other molding material may be effected and when the table is turned over much time is lost by the operator using the machine having to release each box separately and as the operator must also work the lever or gear for raising the platform of the machine, each fastening must be within reach of such operator so that the length and width of the turn-over-table and the number of boxes which may be grouped thereon are limited. Furthermore in the molding of rice-bowls and other hollow and flat ware as hitherto practiced much inconvenience and unnecessary labor on the part of the operatives and damage to molds have been experienced in the manipulation of molding boxes containing parts of molds formed by the use of turn-over-tables and requiring to be turned over after being released from the tables on which they are formed and to be placed upon other molding boxes to serve without being turned over as counterparts for the boxes turned over in order to complete molds for use in casting.

The principal object of the first part of this invention is to enable molding boxes and runners to be easily secured in position upon turn-over-tables of molding machines during the formation of molds for rice-bowls and other hollow and flat ware and until it is desirable to release the molding boxes and runners after the turn-over-tables on which the molds are formed have been turned over, and so to obviate the inconvenience and damage hitherto experienced in the use of molding machines with turn-over-tables in consequence of the movement of runners during molding and premature release of runners and molding boxes and to enable a greater number of molding boxes than hitherto possible to be used if desirable in any case upon a turn-over-table.

According to the first part of this invention the turn-over-table of a molding machine is provided with catches capable of being moved into and out of position to hold the molding boxes in position for sand or other molding material to be rammed or compressed therein and mechanism is provided to operate such catches simultaneously and if a runner or runners be used to operate also, in operating such catches, a catch or catches used to secure in position the runner or runners used with a or the mold or molds upon the turnover-table a suitable projection or projections or other engaging part or parts being provided upon the runner or runners to be engaged with such catch or catches. The mechanism to operate the said catches to hold the molding box or boxes and a catch or catches if any, to secure the runner or runners, if any be used, may be a rod or shaft or rods or shafts which is or are provided with or connected in any suitable way to a handle or lever or other device by means of which it or they may be moved simultaneously by the operator to hold and to release the parts with which the said catches are used and is or are connected by cams or levers or linkwork to the said catches, and in one form which is simple, convenient and efficient may be a rod connected to a hand-lever and connected by arms to the catches used to secure the molding-box or molding-boxes in position upon a turn-over-table and bearing a projecting catch or projecting catches to secure the runner or runners to be used with such molding box or one or more of the molding boxes. Conveniently the said rod may be mounted in or made to pass through strengthening ribs or other strengthening devices formed or provided upon the turn-over-table and preferably the strengthening ribs or other strengthening devices formed or provided upon the turn-over-table are made to aid in counterbalancing the weight of the molding-boxes in the turning over of the turn-over-table. A quadrant or quadrants or stop or stops of any convenient form may be provided to limit the extent to which the handle or lever or other device to be moved by the operator may be moved. In any case in which a catch, whether to hold a molding box or to hold a runner, is made to turn about an axis it is preferable to arrange it also that in turning it shall be moved by means of or made to act upon a screw-thread or screw-threads or incline or inclines or cam-surface or cam-surfaces so that it may be made to press more firmly and accurately into the desired position the part which it is intended to secure.

A catch provided according to this invention may be provided with one device or two or more devices to engage with the part which it is to be used to secure, and preferably such device or devices is or are made adjustable so as to be readily used at different times for holding parts of boxes of different sizes and forms.

In the accompanying drawings this invention is illustrated as applied to a molding machine with a turn-over-table, the turn-over-table of which is provided with two half parts $u$, $u'$ of a pattern intended in the case illustrated for the molding of rice-bowls. The rim of the concave pattern $u'$ is flush with the face of the turn-over-table and the convex part $u$ which projects upwards therefrom during the ramming or compression of molding material upon it is furnished with a longitudinal or transverse slot to receive and hold in position the runner $t$. With the parts $u$, $u'$ of the pattern there are provided respectively a top-part box $e$ and a bottom-part box $d$. The bottom-part box $d$ is shown as provided with snugs 21 provided with pins 22 to enter holes in the turn-over-table $a$ in order to insure that the bottom-part box $d$ is in proper position thereon relatively to the part $u'$ of the pattern and also in the case illustrated to enter holes formed in snugs or ears 23 on the top part $e$ in order to insure that the top part $e$ shall be placed in proper position upon the bottom part $d$. The turn-over-table $a$ is shown as provided with pins 24 to enter the holes in the snugs or ears 23 in order to insure that the top-part-box $e$ shall be placed upon the turn-over-table $a$ in proper relation to the part $e$ over the pattern. Handles 25 are shown as provided upon the top-part-box $e$ to facilitate the manipulation of the top-part-box $e$.

The first part of this invention is illustrated by Figs. 1 and 2 of the accompanying drawings which also serve for the illustration of a further part of this invention, and in Fig. 3 thereof.

In Figs. 1 and 2, $a$ is the turn-over-table of the molding machine and $b$ $b$ and $c$ are catches provided thereon in accordance with the first part of this invention to secure to the turn-over-table $a$ the molding boxes used therewith, of which two $d$, $e$, are shown in position thereon. Each of the molding boxes $d$ $e$ is shown as provided with two snugs, ears or projections $f$ to be engaged by the catches $b$ $c$ by which such molding-box $d$ or $e$ as the case may be is to be secured in position. Each of the catches $b$ $c$ is shown as provided with a block $g$ having one projecting part to engage with one projection $f$ and the catch $c$ is shown as provided with a block $g$ provided with two projections to engage in the manner clearly indicated in Fig. 3 with two lugs, ears or projections $f$ $f$ one on each side of the two molding boxes $d$ $e$ to be secured at one time to the turn-over-table $a$. Each of the catches $b$ $c$ is shown as provided with a screwed shank $h$ upon which the block $g$ used in such catch is screwed and capable of being adjusted in position and secured by means of a lock-nut $i$. Each of the screwed shanks $h$ is screwed into screw-threads formed in the turn-over-table $a$ and is made capable of being turned somewhat easily in the screw-threads in which it is mounted and is shown as provided with an arm $j$ mounted fast upon it by means of a square or key and a nut $k$. Each of the arms $j$ being preferably forked at its end as shown is connected as by a pin $l$ to a rod $m$ serving to connect the catches $b$ $c$ so that they may be operated simultaneously. The arm $j$ of the catch $c$ as shown forms one arm of a hand-lever $o$ by means of which the catch $c$ and by means of the rod $m$ the catches $b$ may be turned to or from the position in which they are indicated in full lines in Fig. 2 to or from the position in which they are indicated in dotted lines in such figure. Preferably the rod $m$ is mounted to be slid longitudinally and laterally in holes formed in the stiffening ribs formed on the turn-over-table $a$ and preferably the said stiffening ribs are made of such mass as to counter-balance to the extent desirable the molding boxes $d$ $e$ so as to facilitate the movement of the turn-over-table $a$.

The hand-lever $o$ is shown as made to project beyond the edge of the turn-over-table $a$ so as to be readily operated by the workman using or working at the molding machine. Preferably the rod $m$ or the lever $o$ is connected by a link $n$ to a hand-lever $o'$ mounted on a stud $p$ and held thereon by a pin or collar or otherwise and projected beyond the edge of the turn-over-table $a$ at the side opposite to that at which the hand-lever $o$ projects so that the catches $b$, $c$ may be operated with equal convenience from one side of the turn-over-table $a$ whether in the position in which it is shown in full lines in Fig. 1 or turned over. The hand-lever $o$ and arm $j$ and if it be used the other hand-lever $o'$ aforesaid are proportioned so that the movement of the hand-lever $o$, or either hand-lever $o$ or $o'$ if two be used through a convenient angle in one direction or the other will suffice to turn the catches $b$, $c$ into or out of engagement with the projecting parts $f$ as may be necessary from time to time in the use of the turn-over table $a$. When the catches $b$ $c$ have been turned out of position for engagement with molding boxes the hand-lever $o$ or $o'$ being turned into the position in which it is indicated by dotted lines in Fig. 2 and molding boxes such as $d$, $e$ are brought beneath the turn-over-table $a$ and presented to it in proper position by the raising by manual labor or by hydraulic or pneumatic pressure or otherwise of the platform of the molding machine or laid upon the turn-over-table $a$ in proper position the hand-lever $o$ or $o'$ being turned from the position in which it is indicated by dotted lines in Fig. 2 to the position in which it is indicated by full lines in such figure, the catches $b$, $c$, will be brought simultaneously into position to engage with the projecting parts $f$ of the molding-boxes $d$, $e$ and while the said catches $b$, $c$ are being brought into position to engage with the projecting parts $f$ the screwed shanks are screwed in the turn-over-table $a$ so that the projecting parts of the catches $b$ $c$ which engage with the projecting parts $f$ are pressed firmly thereon and made to press the molding boxes $d$, $e$ firmly against the turn-over-table $a$ so that there shall be no opportunity for the said molding boxes to be displaced by the ramming or compression of the sand or other molding material until the hand-lever $o$ or $o'$ is made to release them and thus imperfections in the molding and the castings produced which have hitherto been caused by the premature displacement of molding boxes and runners used with the patterns used with turn-over-tables are obviated.

In Figs. 1, 2, 3, $q$ is a catch to hold in position the runners used from time to time in the formation of molds upon the pattern $u$ in the molding box $e$ or other box used instead thereof from time to time. The catch $q$ is shown as secured by a set-screw $r$ in a suitable position upon the rod $m$ and is shown as provided with a projecting part $q'$ to enter one or other of two notches B formed in a projecting part $s$ formed upon each runner $t$ to be secured in the pattern $u$ and the molding box $e$ or other molding box during the ramming or consolidation of sand or other molding material therein. The projecting part $s$ of the runner $t$ is shown as made to project through the pattern $u$ on the turn-over-table $a$ with which it is to be used to such a distance that the projection $q'$ when in engagement with either of the notches B in the projecting part $s$ will hold the runner $t$ in the requisite close contact with the pattern $u$ so as to prevent the entry of sand or other molding material between the runner $t$ and the pattern $u$ except when desirable and thereby insure that molds and castings of perfect form shall be produced. The catch $q$ in the case illustrated in the accompanying drawing is so shaped and placed that it may engage with one of the notches B whether the runner $t$ be placed in the part $u$ of the pattern in the position indicated in Fig. 2 or at right angles to that position as indicated in Fig. 3.

When the runner $t$ is being applied to the part $u$ of the pattern the hand-lever $o$ or $o'$ is turned into the position indicated by dotted lines in Fig. 2 in order to move the catch $q$ aside in order that the projection $s$ of the runner $t$ may be brought into position to be held and then the hand-lever $o$ or $o'$ is moved back into the position in which it is indicated in full lines in order to bring the catch $q$ into engagement with one or other of the notches B and to again bring the catches $b$, $c$, into engagement with the snugs, ears or projections $f$. In the movement of the hand-lever $o$ or $o'$ from the position in which it is indicated in full lines in Fig. 2 to release the molding boxes $d$, $e$ from the turn-over-table when turned over, the runner $t$ is released simultaneously with the molding boxes $d$, $e$. In any case in which it may be desirable the catch or catches to hold a runner or runners may be mounted to swivel in a suitable support or supports similarly to the catches $b$, $c$ and preferably when made to swivel is or are made to screw in the part on which it or they is or are mounted. A catch 29 of this kind is illustrated in Figs. 9 and 10 in which a stem 30 screwed and adapted to oscillate in the table $a$ is furnished at its upper end with inwardly directed ears 31 in the form of sectors of a ring, one or other of which may, when the stem 30 is turned in one direction, be made to engage the part $s$ of a runner, according to the position in which such part $s$ may be inserted in a pattern.

The gripping devices for holding molding boxes and gripping devices for holding runners provided according to this first part of this invention are also applicable to "turn-over-boards" or "rolling-over-boards" as ordinarily used in the formation of molds for hollow or flat ware.

Although hereinbefore generally described as applicable in the formation of molds for casting rice-bowls and other hollow and flat ware this part of this invention is applicable in the formation of molds of other kinds which may be formed by the use of turn-over-tables, such variations being introduced in the mechanism as may be necessary in different cases.

The object of a further part of this invention is to facilitate the manipulation of molding boxes containing those parts of molds for rice-bowls or other hollow and flat ware formed by the use of turn-over-tables which after being released from the tables on which they are formed require to be turned over and to be placed upon other molding boxes to complete molds for use in casting. According to this part of this invention which may be applied in conjunction with or independently of the hereinbefore described part of this invention in order to facilitate the manipulation of molding boxes containing molds and the placing together of molding boxes for use in casting, a carriage to be placed beneath and removed from beneath the turn-over-table of a molding machine is provided with suitable attachments or supports provided to receive the "top part" box or boxes or other molding box or boxes requiring to be turned over for use while it or they is or are in an inverted position or other position from which it or they must afterwards be turned over and to lessen the exertion of the operator. Each molding box with which the said attachments or supports are to be used is provided with trunnions or other projections or sockets to engage with sockets or projections on the said attachments or supports. A suitable opening or openings is or are provided if necessary between the said attachments or supports and the carriage to permit runners, if any be used, to pass away from the mold or molds when the turn-over-table on which it or they is or are formed is inverted and the runner or runners if previously secured is or are released. A carriage provided according to this second part of this invention mounted on wheels to run on rails through the side of a molding machine having a turn-over-table on to a table capable of being raised and lowered so as to be brought into and "registered" in position to engage with the inverted and still gripped molding boxes on the turn-over-table so that after the said molding boxes and the runner or runners if any used therewith are released the carriage may receive the molding boxes and the molding material therein and be run off the said table is illustrated by Figs. 1, 2, 4, 5 and 6 of the accompanying drawing.

In Figs. 1, 4, 5 and 6, $v$ is the carriage provided according to this second part of this invention. The carriage $v$ is shown as provided with wheels $w$ to run on rails $x$ by which it may be led to and from the platform $y$ of the molding machine. Conveniently the carriage $v$ may be brought to the molding machine in the direction indicated by the arrow C in Fig. 1 and be removed from the said molding machine in the direction indicated by the arrow D in Fig. 1. The carriage $v$ is shown as provided with a platform $z$ provided with two pedestals or guides 1 in which are mounted so as to be capable of being moved up and down blocks 2 provided with stems 3 surrounded by springs 4 which bear at their upper ends against the blocks 2 and at their lower ends against cross-bars 5 serving as guides to the stems 3. The stems 3 are shown as provided with nuts 6 to limit the upward movement of the blocks 2. The upper surfaces of the blocks 2 may be flat as shown in the accompanying drawings in Figs. 5 and 6, or may be provided with hollows as illustrated in Fig. 11 of the said drawings and are provided to receive suitable supports, in the case illustrated trunnions 7 formed upon the molding boxes as for example upon the molding box $e$ which requires to be turned over and placed upon other molding-boxes as for example the molding box $d$, for the completion of the molds in which castings are to be formed. Preferably the trunnions 7 are placed in the manner indicated in the accompanying drawings to one side of the line about which the molding box $e$ is made to turn so that when a molding box $e$ on which the trunnions 7 are formed is filled with sand or other molding material, the axes of the trunnions 7 thereon shall be in a line somewhat to one side of the center of gravity of the molding-box $e$ and the molding material therein so that until it is time for it to be turned over the said molding box $e$ shall bear steadily with one part upon the platform $z$ of the carriage $v$, when turned to the extent desired in either of the two directions in which it may be turned.

The platform $z$ of the carriage $v$ is shown as formed with a hole E between the pedestals or guides 1 in order to permit the molding-box $e$ to be turned over and that runners to be dropped out of molding boxes $e$ which may at any time be mounted on the blocks 2 may pass through when dropped from such molding boxes $e$. In the case illustrated in the accompanying drawing the hole E is shown as so shaped and disposed in relation to the position of the trunnions 7 that the molding-box $e$ rests upon the platform $z$ near the edge E' of the hole E so as to be prevented from being turned further in the direction opposite to that indicated by the arrow G in Fig. 1 and that while the edge $E^2$ of the hole E shall not interfere with the passage of the portion $e'$ of the molding box $e$ in the inversion of such molding box $e$ around the axes of the trunnions 7 from or into the position in which it is indicated by dotted lines in Fig. 1, the part $e^2$ of the molding box $e$ in the inversion thereof in the direction indicated by the arrow G from the position in which it is indicated by dotted lines in Fig. 1 shall arrive against the platform $z$ near the said edge $E^2$ and the carriage $v$ and molding box $e$ being supported thereby so that the molding box $e$ can be then turned no farther in the direction indicated by the arrow G.

The carriage $v$ with a molding box $e$ mounted on the blocks 2 being brought on to the platform $y$ of the molding machine beneath the turn-over-table $a$ so that the molding box is brought into the position indicated by dotted lines in Fig. 1 and raised by means of such platform $y$ either by the simple raising of such platform itself or as I consider preferable by means of supplementary lifting devices which will be hereinafter described so that the said molding box $e$ shall be brought against the turn-over-table $a$ which has been previously turned over from the position in which it is indicated in Figs. 1 and 2 so that the catches $b$, $c$ are turned downwards and the said molding box $e$ is secured by the catches $b$, $c$, to the turn-over-table $a$ and the platform $y$ being lowered so that the carriage $v$ may be clear of the molding box $e$ the turn-over-table $a$ is then turned into the position in which it is indicated in Figs. 1 and 2 and the runner $t$ being placed in position is secured by the hand-lever $o$ or $o'$ being fully turned into the position in which it is indicated in full lines in Fig. 2, then the said molding-box $e$ is filled with sand or other molding material which is rammed or consolidated in any suitable way and the molding box $e$ is rapped or otherwise treated so as to loosen the mold from the pattern $u$ and the runner $t$ from the molding material and then the turn-over-table $a$ is turned over again, so that the platform $y$ and carriage $v$ being raised the blocks 2 may receive the trunnions 7 and the catches $q$ and $b$, $c$ are disengaged to release the runner $t$ and allow it to fall through the hole E for further use and also release the said molding box $e$ and then the platform $y$ and carriage $v$ being lowered the carriage $v$ is removed from the platform $y$ to the place where the molding box $e$ is to be turned over on to the other molding box $d$ to be used with it and eventually the molding box $e$ and carriage $v$ are used for further operations similar to those hereinbefore described.

By the trunnions 7 being placed in a line at one side of the center of gravity of the molding-box $e$ and the hole E being shaped and disposed as hereinbefore described it is made easy to ascertain that the molding box $e$ has been placed upon the blocks 2 in proper position to be presented in the manner requisite to the turn-over-table $a$ and afterwards by a simple movement when turned over to be transferred to and placed upon the molding box $d$, as unless placed with the proper trunnions 7 on each block 2, the molding box $e$ will be incapable of resting upon the platform $z$ of the carriage $v$.

Each of the hereinbefore described parts of this invention may be applied to turn-over-tables furnished with any desirable number of patterns either to form parts of molds to be used together or otherwise and it will be obvious that in the use of catches such as are hereinbefore described for more than two molding boxes on one side of a turn-over-table any desirable number of catches to hold molding boxes and any desirable number of catches to hold runners during molding may be mounted on one turn-over-table and within the scope of the appended claims other forms of mechanism than that hereinbefore described with reference to the accompanying drawings may be used to operate the said catches together, and that two or more pairs of blocks 2 or equivalent parts will be used in such cases.

In any cases in which it or they may be desirable an elevated supporting block extending upwards from the carriage may be provided upon the carriage used with a turn-over-table in order that when the turn-over-table is inverted both or all the molding boxes whether to be turned over or to be used without turning over as a counterpart or counterparts for a box or boxes turned over shall be ready to be received alike upon the carriage. An elevated supporting-block used in this way is illustrated as provided upon the carriage $v$, 8 being such a supporting block. The supporting-block 8 is made complementary to the blocks 2, being of such a height that the molding box $e\ d$ resting upon it is brought into contact with the turn-over-table $a$ at the same time as the molding box supported by the blocks 2.

The supporting block 8 is shown as provided with buffers 26 capable of being moved up and down in it so that the molding box $d$ or other corresponding molding box may be received upon it without shock. Preferably the buffers 26, one of which is shown in Fig. 7 in section and upon a larger scale than in Figs. 5 and 6, are made pointed as shown in the accompanying drawing in order that entering the corresponding recesses formed in the snugs or ears on the bottom of the molding box $d$ they will serve to "register" the molding box $d$ upon the supporting-block 8 and thus insure it being presented in proper condition to the turn-over-table $a$. Conveniently the placing of one of the pins 22 of the molding box $d$ in one position relatively to the buffers 26 may serve as an indication that the molding box $d$ is placed upon the supporting-block 8 in proper position to be brought against the turn-over-table $a$ and to receive afterwards the molding box $e$. The buffers 26 may conveniently be made to slide in openings formed in the top of the supporting block 8 and be provided internally with springs 27 surrounded by them and surrounding rods which are made to pass through and be guided by cross-bars 28 secured to the top of the supporting-block 8 the said spring 27 enabling the buffers 26 to yield when molding boxes are placed thereon and being protected by the buffers 26 from the access of sand or other molding material.

The supporting block 8 in the case illustrated in the accompanying drawing is intended to support both the molding boxes $d$ and $e$ when the molding box $e$ is inverted and placed upon the molding box $d$ for a casting to be formed. As is clearly indicated in Fig. 8, the supporting block 8 is furnished with hooks 9 to engage with snugs or ears 10 formed on the molding box $e$ when such molding box $e$ is inverted and placed upon the molding box $d$ for casting to take place. The hooks 9 are shown as made to pass through holes in the upper surface of the block 8 and preferably made adjustable in length for use at different times with molding boxes of different heights and in the case illustrated are each formed in two parts one of which is screwed into the other. Each of the hooks 9 is shown as formed with a slot 11 to embrace one of the cams 12 shown as fast upon a shaft 13 mounted and capable of being turned in the supporting block 8 and provided with a handle 14 so as being turned in one direction, when the hooks 9 are engaged with the ears 10, to cause such hooks 9 to hold the molding boxes $d$, $e$ firmly upon the supporting blocks 8 and being turned in the other direction to set the hooks 9 free to be disengaged from the snugs or ears 10 and release the molding boxes $d$, $e$ for the removal of a casting therefrom. After the removal of the casting from the molding boxes $d$, $e$ the molding box $d$ may be placed upon the supporting block 8 and the molding box $e$ is mounted upon the blocks 2 in readiness for the carriage $v$ to be brought again beneath the turn-over-table $a$ for the molding-boxes $d$, $e$ to be again secured to such turn-over-table $a$ for the formation of a further mold in the manner hereinbefore described. The slots 11 in the hooks 9 enable them when disengaged from the snugs or ears 10 to drop down so as not to be in the way when the molding-box $e$ is to be brought against the turn-over-table $a$. Obviously two or more supporting blocks 8 provided with hooks 9 and means to operate them may be provided on one carriage $v$ if desirable in any case.

In order that the carriage $v$ may be raised with greater precision to bring the molding boxes $d$, $e$ upon it into contact with the turn-over-table $a$ or to receive the molding boxes $d$, $e$, from the turn-over-table and to obviate danger of strain of any parts should the platform $y$ of the molding machine be raised by pneumatic or hydraulic pressure or by mechanical power, I prefer to provide the platform $y$ with the supplementary plate 15 which in the case illustrated is shown as capable of being raised and lowered by cams 16 fast upon the shafts 17 mounted in the platform $y$ and connected by arms 18 and a rod 19 to a handle 20 by means of which they may be turned to raise and lower the plate 15 and the carriage $v$ resting thereon relatively to the platform $y$ and so enable the molding boxes $d$, $e$ to be raised by the operator into contact with the turn-over-table $a$ and to be released from the turn-over-table $a$ and transferred without undue shock to the support afforded by the supporting-block 8 and trunnions 7, by the supporting block 8 and blocks 2 being brought against the molding box $d$ and trunnions 7, after the platform $y$ has been raised to the desired height by the means provided to operate it. In this way the operator is relieved of the greater part of the work of raising and lowering the molding boxes $d$, $e$ while he is enabled to effect the final setting of the molding boxes $d$, $e$ against the turn-over-table $a$ and the bringing of the supporting-block 8 and the blocks 2 against the molding box $d$ and trunnions 7 respectively, with any gentleness or precision desirable. It will be readily understood that instead of the supplementary plate 15 or an equivalent part and cams 16 or other means of raising it being provided on the platform *y* the plate forming the top of the carriage *v* or an equivalent part may be made capable of being raised or lowered relatively to the framework by means of cams, shafts, arms, rods and a handle similar to the cams 16, shafts 17, arms 18, rods 19 and handle 20 and that instead of such cams, shafts, arms, rods and handles or other equivalent devices as is shown in Fig. 11 of the accompanying drawings in which cams 32 connected by a connecting rod 33 and adapted to be operated by a handle 34, are mounted in the framework of the carriage *v* to raise and lower the upper plate *z* thereof.
The provision of the supplementary plate 15 or equivalent part upon the platform *y* or a corresponding movable plate or equivalent part upon the carriage *v* is specially advantageous in any case in which the platform of the molding machine is raised by pneumatic or hydraulic pressure or by mechanical means and in which a turn-over-table is made to receive molding boxes on two opposite sides and there is consequently a probability of molding boxes at one side of the turn-over-table projecting further from the axis about which the turn-over-table is made to turn than those at the other side thereof.
The provision of catches connected to be operated together according to the first part of this invention obviates damage to castings being caused by undesired displacements of molding boxes upon turn-over-tables and undesired displacements of runners and makes it practicable to mount upon one turn-over-table a greater number of molding boxes than it has hitherto been practicable to use.
The application of gripping devices for holding molding boxes and gripping devices for holding runners to "turn-over-boards" and "rolling-over-boards" is attended with advantages similar to those afforded by their application to turn-over-tables as hereinbefore described.
The employment of a carriage and still more of a number of carriages such as those hereinbefore described in reference to the second part of this invention relieving operators of much of the labor of handling molding boxes avoids much of the strain put upon operatives and the damage to molds due to the difficulty of handling them causing the operatives to subject them at times to unnecessarily violent treatment in moving them and facilitates the rapid and economical production of molds. Furthermore the provision of the supporting-block 8 or supporting-blocks similar to the supporting-block 8 upon a carriage provided with supports for mold-
ing boxes requiring to be turned over and to be placed upon other boxes may, as in the case illustrated in the accompanying drawings, make it only necessary to transfer the molding box which has been turned over on to another molding box level with or substantially level with the supports carrying such molding box which has been turned over and so obviate or minimize as much as possible the lifting and lowering of the turned-over-molding-box by the operator transferring it to or from the other molding box which serves as a counterpart without turning over and on or from which it needs to be placed or removed to the said supports.

What I do claim as my invention and desire to secure by Letters Patent is:—

1. The combination with the turn-over-table of a molding machine, of screw-threaded members movably mounted in said turn-over-table, catches mounted on said screw-threaded members to hold molding boxes and means connected to said screw-threaded members for simultaneously operating said catches, substantially as herein described.

2. The combination with the turn-over-table of a molding machine, of screw-threaded members movably mounted in said turn-over-table, catches mounted on said screw-threaded members to hold molding boxes, a catch to hold a runner and means connected to said screw-threaded members for simultaneously operating said catches, substantially as hereinbefore described.

3. The combination with a turn-over-table of a molding machine, of catches movably mounted on such turn-over table to hold molding boxes, a catch to hold a runner and means to connect such catches to a handle and a handle connected thereto to move all such catches, substantially as hereinbefore described.

4. The combination with a turn-over-table of a molding machine, of catches movably mounted in such turn-over-table to hold molding boxes, a catch to hold a runner and means to connect such catches to handles and handles connected thereto to move all such catches, substantially as hereinbefore described.

5. The combination with a turn-over-table of a molding machine, of catches movably mounted on such turn-over-table to hold molding boxes, a catch to hold a runner, means to connect such catches to handles, and handles connected thereto to move all such catches and made to extend to opposite sides of the turn-over-table, substantially as hereinbefore described.

6. The combination with a carriage movable to and from a molding machine with a turn-over-table, of attachments on the said carriage to receive from the molding machine molding boxes requiring to be turned over and to be placed upon other molding boxes for casting to be accomplished, substantially as hereinbefore described.

7. The combination with a carriage movable to and from a molding machine with a turn-over-table, of attachments on the said carriage to receive molding boxes requiring to be turned over and to be placed upon other molding boxes for casting to be accomplished, parts movable in such attachments to form bearing surfaces and springs interposed between such parts and the said attachments, substantially as hereinbefore described.

8. The combination with a carriage movable to and from a molding machine with a turn-over-table, of attachments on the said carriage to receive from the molding machine molding boxes requiring to be turned over and to be placed upon other molding boxes for casting to be accomplished and an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning and to minimize lifting and lowering of molding boxes in turning over and superimposition in manipulation, substantially as hereinbefore described.

9. The combination with a carriage movable to and from a molding machine with a turn-over-table, of attachments on the said carriage to receive from the molding machine molding boxes requiring to be turned over and to be placed upon other molding boxes for casting to be accomplished, parts movable in such attachments to form bearing surfaces, springs interposed between such parts and the said attachments and an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning and to minimize lifting and lowering of molding boxes in turning over and superimposition in manipulation, substantially as hereinbefore described.

10. The combination with a carriage movable to and from a molding machine with a turn-over-table, of attachments on the said carriage to receive from the molding machine molding boxes requiring to be turned over and to be placed upon other molding boxes for casting to be accomplished, an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning and to minimize lifting and lowering of molding boxes in turning over and superimposition in manipulation and buffers in such elevated supporting block to minimize shock in the application of molding boxes upon such elevated supporting block, substantially as hereinbefore described.

11. The combination with a carriage movable to and from a molding machine with a turn-over-table, of attachments on the said carriage to receive from the molding machine molding boxes requiring to be turned over and to be placed upon other molding boxes for casting to be accomplished, parts movable in such attachments to form bearing surfaces, springs interposed between such parts and the said attachments, an elevated supporting block on the said carriage complementary to the said attachments to receive molding boxes to be used without being turned over as counterparts for the said boxes needing to be turned over and thereby to compensate for differences in height of the molding boxes needing to be turned over and the boxes not needing turning and to minimize lifting and lowering of molding boxes in turning over and superimposition in manipulation and buffers in such elevated supporting block to minimize shock in the application of molding boxes upon such elevated supporting block, substantially as hereinbefore described.

12. The combination with a carriage movable to and from a molding machine with a turn-over-table, of attachments on the said carriage to receive from the molding machine molding boxes requiring to be turned over, and to be placed upon other molding boxes for casting to be accomplished, an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning and to minimize lifting and lowering of molding boxes in turning over and superimposition in manipulation and pointed buffers in such elevated supporting block to minimize shock in the application of molding boxes upon such elevated supporting block, and to facilitate the placing in requisite position of the molding boxes placed on such elevated supporting block, substantially as hereinbefore described.

13. The combination with a carriage movable to and from a molding machine with a turn-over-table, of attachments or supports on the said carriage to receive from the molding machine molding boxers requiring to be turned over and to be placed upon other molding boxes for casting to be accomplished, parts movable in such attachments to form bearing surfaces, springs interposed between such parts and the said attachments, an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning and to minimize lifting and lowering of molding boxes in turning over and superimposition in manipulation and pointed buffers in such elevated supporting blocks to minimize shock in the application of molding boxes upon such elevated supporting block and to facilitate the placing in requisite position of the molding boxes placed on such elevated supporting block, substantially as hereinbefore described.

14. The combination with a carriage movable to and from a molding machine with a turn-over-table, of attachments on the said carriage to receive molding boxes requiring to be turned over and to be placed upon other molding boxes for casting to be accomplished, an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning and to minimize lifting and lowering of molding boxes in turning over and superimposition in manipulation and hooks mounted in such elevated supporting block to engage with molding boxes placed on such supporting block, substantially as hereinbefore described.

15. The combination with a carriage movable to and from a molding machine with a turn-over-table, of attachments on the said carriage to receive molding boxes requiring to be turned over and to be placed upon other molding boxes for casting to be accomplished, parts movable in such attachments to form bearing surfaces, springs interposed between such parts and the said attachments, an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning and to minimize lifting and lowering of molding boxes in turning over and superimposition in manipulation and hooks mounted in such elevated supporting block to engage with molding boxes placed on such supporting block, substantially as hereinbefore described.

16. The combination with a carriage movable to and from a molding machine with a turn-over-table, of attachments on the said carriage to receive molding boxes requiring to be turned over and to be placed upon other molding boxes for casting to be accomplished, an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning and to minimize lifting and lowering of molding boxes in turning over and superimposition in manipulation, buffers in such elevated supporting block to minimize shock in the application of molding boxes upon such elevated supporting block and hooks mounted in such elevated supporting block to engage with the molding boxes placed on such supporting block, substantially as hereinbefore described.

17. The combination with a carriage movable to and from a molding machine with a turn-over-table, of attachments on the said carriage to receive molding boxes requiring to be turned over and to be placed upon other molding boxes for casting to be accomplished, parts movable in such attachments to form bearing surfaces, springs interposed between such parts and the said attachments, an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning and to minimize lifting and lowering of molding boxes in turning over and superimposition in manipulation, buffers in such elevated supporting block to minimize shock in the application of molding boxes upon such elevated supporting block and hooks mounted in such elevated supporting block to engage with the molding boxes placed on such elevated supporting block, substantially as hereinbefore described.

18. The combination with a carriage movable to and from a molding machine with a turn-over-table, of attachments or supports on the said carriage to receive molding boxes requiring to be turned over and to be placed upon other molding boxes for casting to be accomplished, an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning, and to minimize lifting and lowering of molding boxes in turning over and superimposition in manipulation, pointed buffers in such elevated supporting block to minimize shock in the application of molding boxes upon such elevated supporting block and to facilitate the placing in requisite position of the molding boxes placed on such elevated supporting block, and hooks mounted in such elevated supporting block to engage with the molding boxes placed on such elevated supporting block, substantially as hereinbefore described.

19. The combination with a carriage movable to and from a molding machine with a turn-over-table, of attachments on the said carriage to receive molding boxes requiring to be turned over and to be placed upon other molding boxes for casting to be accomplished, parts movable in such attachments or supports to form bearing surfaces, springs interposed between such parts and the said attachments, an elevated supporting block on the said carriage complementary to the said attachments to receive molding boxes to be used without being turned over as counterparts for the said boxes needing to be turned over and thereby to compensate for differences in height of the molding boxes needing turning and the boxes not needing turning and to minimize lifting and lowering of molding boxes in turning over and superimposition in manipulation, pointed buffers in such elevated supporting block to minimize shock in the application of molding boxes upon such elevated supporting block and to facilitate the placing in requisite position of the molding boxes placed on such elevated supporting blocks and hooks mounted in such elevated supporting block to engage with the molding boxes placed on such elevated supporting block, substantially as hereinbefore described.

20. In a molding machine with a turn-over-table, the combination of a platform to be raised and lowered, a supplementary plate mounted on the said platform and to be raised in relation thereto and means, including a handle to operate them, to raise the said supplementary plate in relation to the said platform and a carriage movable on to and off the said supplementary plate, substantially as hereinbefore described.

21. In a molding machine with a turn-over-table, the combination of a platform to be raised and lowered, a supplementary plate mounted on the said platform and to be raised and lowered in relation thereto, cams to raise the said supplementary plate mounted in the said platform and means to operate the said cams and raise the said supplementary plate in relation to the said platform and a carriage movable on to and off the said supplementary plate, substantially as hereinbefore described.

22. In a molding machine with a turn-over-table, the combination of a platform to be raised and lowered, a supplementary plate mounted on the said platform and to be raised in relation thereto, cams to raise the said supplementary plate mounted in the said platform, shafts to carry the said cams and a handle to operate the said cams and raise the said supplementary plate in relation to the said platform and a carriage movable on to and off the said supplementary plate, substantially as hereinbefore described.

In testimony, that I claim the foregoing as my invention, I have signed my name in presence of two witnesses, this twenty-ninth day of March 1905.

JOHN BUTLER.

Witnesses:
RUTH MAGDALENE WILSON,
HOWARD CHEETHAM.